(12) United States Patent
Hsu

(10) Patent No.: US 7,076,644 B2
(45) Date of Patent: Jul. 11, 2006

(54) SYSTEM AND METHOD FOR QUICK BOOT AND APPLICATION SWITCHING FOR A COMPUTER SYSTEM

(75) Inventor: Hao-Chan Hsu, Taipei (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 622 days.

(21) Appl. No.: 10/355,380

(22) Filed: Jan. 31, 2003

(65) Prior Publication Data

US 2004/0093489 A1    May 13, 2004

(30) Foreign Application Priority Data

Nov. 12, 2002    (TW) .............................. 91133181 A

(51) Int. Cl.
*G06F 9/06*    (2006.01)

(52) U.S. Cl. .............................. 713/1; 713/2

(58) Field of Classification Search .................... 713/1, 713/2

See application file for complete search history.

(56) References Cited

U.S. PATENT DOCUMENTS

| 5,630,074 A | 5/1997 | Beltran |
| 6,308,184 B1 | 10/2001 | Hewitt |
| 6,762,697 B1 * | 7/2004 | Lin .............................. 341/26 |
| 6,865,621 B1 * | 3/2005 | Iwata .......................... 710/20 |

FOREIGN PATENT DOCUMENTS

| CN | 1355474 A | 6/2002 |
| JP | 05-224894 | 9/1993 |
| JP | 2000-242476 | 9/2000 |
| JP | 2002-091783 | 3/2002 |

OTHER PUBLICATIONS

Microsoft Computer Dictionary, 2002, Microsoft Press, Fifth Edition, p. 60.*

"Computex:BIOS with graphical interface and internet access", Heise Online, Jun. 4, 2002, http://www.heise.de/newsticker/meldung/print/27943, Germany.

* cited by examiner

*Primary Examiner*—Lynne H. Browne
*Assistant Examiner*—Tse Chen
(74) *Attorney, Agent, or Firm*—Quintero Law Office

(57) ABSTRACT

A method of rapid booting and switching between applications of a computer system. A software solution is used to implement hot key switching and hot key functions in a computer system to enable rapid booting and switching between applications.

8 Claims, 2 Drawing Sheets

SYSTEM AND METHOD FOR QUICK BOOT AND APPLICATION SWITCHING FOR A COMPUTER SYSTEM

BACKGROUND OF THE INVENTION

1. Field of the Invention

The present invention relates to a real time operating system, and in particular to a method for swiftly booting and switching applications of a computer system.

2. Description of the Related Art

Personal computers with expandability and integration are capable of numerous multimedia functions. Nevertheless, users have to spend time booting the computer system, to execute even one application without using others. As a result, designing hardware to specifically implement hot key booting, switching and functions for initializing needed peripheral devices and applications without an embedded controller is costly.

SUMMARY OF THE INVENTION

Accordingly, an object of the present invention is to provide a method for rapidly booting a computer system to reduce waiting time.

Another object of the invention is to provide a method for quickly switching between applications of the computer system, without initializing peripheral devices and applications embedded to the desired process of the computer system.

According to the object described above, the present invention provides a method for rapid booting and switching between applications of the computer system. Pluralities of applications within the computer system are presented as a plurality of embedded systems, respectively. A first hot key is set to activate a first embedded system relative to a first application. A second hot key is set to activate a second embedded system relative to a second application. The first embedded system is activated by use of the first hot key after which a BIOS of the computer system accordingly initializes peripheral devices corresponding to the first application. The second embedded system is activated by use of the second hot key after which a BIOS of the computer system initializes peripheral devices corresponding to the second application. Finally, the first embedded system is closed after the second embedded system is activated.

The keyboard with hot keys can be a standard keyboard layout or a specifically designed keyboard. If the keyboard is a standard keyboard layout, hot keys can be provided by assigning existing keys on the standard keyboard layout. If the keyboard with hot keys is a specifically designed keyboard, hot keys can be provided by adding dedicated keys to a standard keyboard layout. Hot keys provided by the specifically designed keyboard are capable of booting the computer system. Hot keys provided by assigning existing keys on the standard keyboard layout are not capable of booting the computer system. When hot keys are used and the computer is powered on, the system is booted, peripheral devices corresponding to the hot key are initialized and an application corresponding to the hot key is activated.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The present invention discloses a method and system for rapid booting and switching between applications of a computer system.

Figure 1:
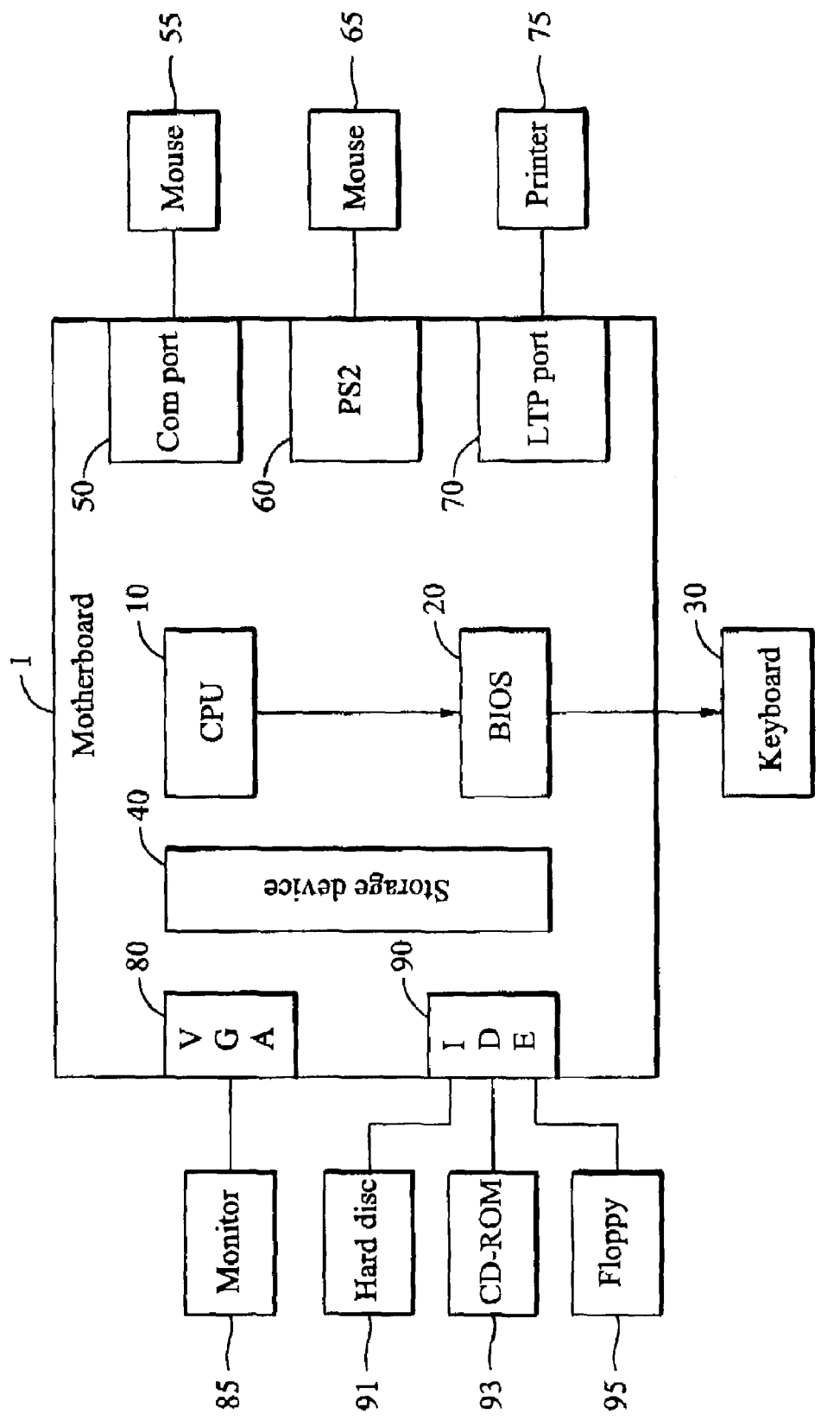
FIG. 1 shows the architecture of a computer system using the method for quickly booting and switching between applications of a computer system of the present invention.

FIG. 1 shows the architecture of a computer system using the method for quickly booting and switching between applications of the computer system of the present invention. The architecture of the computer system comprises a motherboard 1 with a plurality of necessary components. The motherboard 1 comprises a CPU 10, at least one BIOS 20, a keyboard 30, a storage device 40 and a plurality of peripheral devices. The peripheral devices comprise at least a COM port 50, a mouse 55, a PS2 60, a mouse 65, a LPT port 70, a printer 75, a VGA port 80, a monitor AS a IDE port 90, a hard disc 91, a CD-ROM 93 and a floppy disc 95. Furthermore, the storage device 40 has several applications applied to the computer system.

The object of the present invention is to set several hot keys on the keyboard 30 by means of which the CPU 10 activates a corresponding application through the BIOS 20, wherein necessary peripheral devices relative to the application are initialized. The BIOS 20 does not initialize peripheral devices not relative to the application, speeding booting of the computer system.

A keyboard controller generator, a buffer to store keyboard input and a scan code according to the hot key used and then sends an interrupt request controlling an input of the keyboard 30. When a hot key of the keyboard 30 is used, the keyboard controller produces a scan code according to the hot key and stores it in the buffer. The keyboard controller sends an interrupt request through the BIOS 20 to the CPU 10 and then the CPU 10 loads and executes the application relative to the interrupt request of the BIOS 20. Finally, the CPU 10 reads data relative to the scan code from the buffer.

As mentioned above, the present invention implements hot key functions for a computer system, providing the same hot key functions as a computer system with embedded controller. Use of a hot key to start a VCD function, for example, the keyboard controller of the keyboard 30 produces and transmits a corresponding scan code. The BIOS 20 receives the scan code from the keyboard controller and identifies the hot key used based on the scan code. After that, the BIOS 20 initializes peripheral devices corresponding to the VCD function as VGA port 80, monitor 85, IDE port 90 and CD-ROM 93, sending an interrupt request to the CPU 10 according to the scan code and executing the VCD function.

Figure 2:
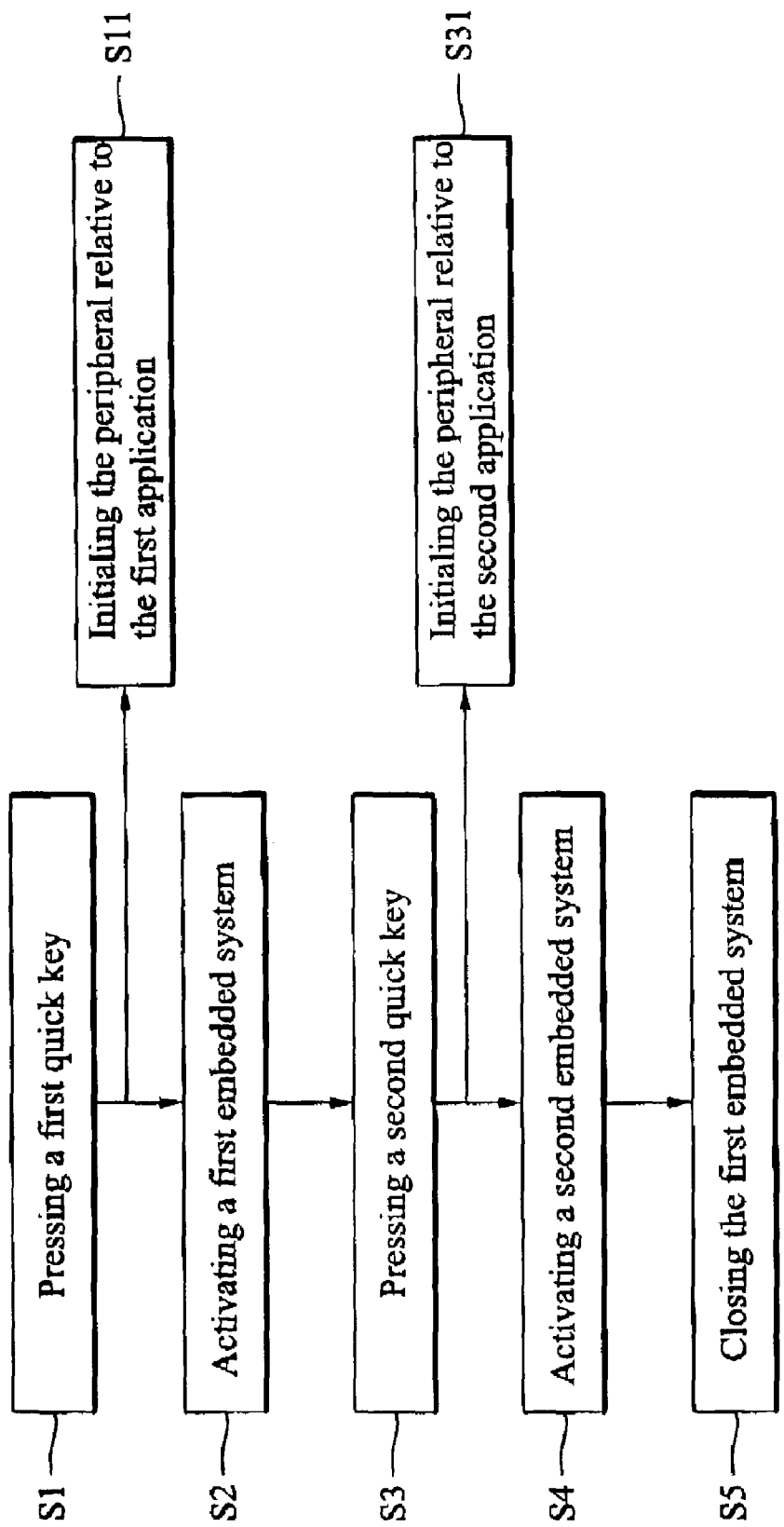
FIG. 2 is a flowchart of detailed steps of quickly booting and switching between applications of the computer system of the present invention.

FIG. 2 is a flowchart of detailed steps of quickly switching between applications of the computer system of the present invention.

A specifically designed keyboard provides the keyboard with hot keys extra disposed thereon. Each of the hot keys can activate an application presented as an embedded system. The hot key is capable of booting the computer system, that is to say, pressing the hot key boots the computer system.

In step S1, the computer system in booted by use of a first hot key to activate a first application.

In step S11, the BIOS initializes the peripheral devices relative to the first application. The BIOS initializes the peripheral devices corresponding to a first embedded system relative to the first hot key.

In step S2, the first embedded system is activated through the BIOS. At use of the first hot key, the BIOS retrieves a scan code from the first hot key by checking a keyboard controller (embedded controller). The first hot key boots the computer system and activates the first embedded system as well.

In step S3, a second hot key is used to activate a second application. A second application is activated at use of the second hot key to switch to the second application.

In step S31, the BIOS initializes the peripheral devices relative to the second application, The BIOS initializes the peripheral devices corresponding to a second embedded system relative to the second hot key.

In step S4, the second embedded system is activated through the BIOS. At use of the second hot key, the BIOS retrieves a scan code from the second hot key by checking the keyboard controller, and then activates and switches to the second embedded system.

In step S5, the first embedded system is closed after the second embedded system is activated.

The BIOS initializes the peripheral devices according to the used hot key and thereby enters the corresponding embedded system. The BIOS does not initialize other unused peripheral devices, shortening the boot time of the computer system. The corresponding hot key is used to enter the related embedded system if switching to other applications.

Hot keys assigned on a standard keyboard layout can also activate embedded systems of the computer, but are not able to boot the computer system. When hot keys are used and the computer is powered on, the system is booted, peripheral devices corresponding to the hot key are initialized and an application corresponding to the hot key is activated.

The present invention presents multimedia functions often used in a computer system as embedded systems and utilizes a software solution to implement hot key switching and hot key functions in the computer system, achieving the stated objects.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for rapidly switching applications, adapted to a computer system, wherein the computer system comprises a plurality of peripheral devices, and the method comprises the steps of:

setting a first hot key for activating a first application relative to the first hot key, the first application corresponds to at least one of the peripheral devices;

setting a second hot key for activating a second application relative to the second hot key, the second application corresponds to at least one of the peripheral devices;

pressing the first hot key to initialize at least one of the peripheral devices relative to the first application through at least one system BIOS of the computer system and thereby activate the first application;

pressing the second hot key to initialize at least one of the peripheral devices relative to the second application through the BIOS of the computer system and thereby activate the second application; and shutting down the first application, wherein peripheral devices not relative to the first application and the second application are not initialized, and the first application and the second application are embedded systems and are switched through the at least one system BIOS.

2. The method as claimed in claim 1, wherein the first hot key and the second hot key are added to a specifically designed keyboard.

3. The method as claimed in claim 1, wherein the peripheral devices initialized are relative to the desired embedded systems through the at least one system BIOS rather than the unused peripheral devices.

4. The method as claimed in claim 3, wherein the peripheral devices comprise a hard disc, a floppy disc, a CD-ROM, a COM port, a PS2 port, a VGA port, a LPT port and a IDE port.

5. A method of quickly booting a computer system, the computer system comprising a plurality of peripheral devices, the method comprising the steps of:

setting up a hot key to activate an application relative to the hot key;

using the hot key to boot the computer system and activate the application; and initializing only peripheral devices corresponding to the application through at least one system BIOS, wherein the peripheral devices not relative to the application are not initialized, and the applications are embedded systems and are switched by a BIOS of the computer system.

6. The method as claimed in claim 4, wherein the hot key is provided by assigning existing keys on a standard keyboard layout.

7. The method as claimed in claim 5, wherein only the peripheral devices relative to the desired embedded systems through the BIOS are initialized rather than the unused peripheral devices.

8. The method as claimed in claim 5, wherein the peripheral devices comprise a hard disc, a floppy disc, a CD-ROM, a COM port, a PS2 port, a VGA port, a LPT port and a IDE port.

* * * * *